United States Patent
Rush

[15] 3,686,833
[45] Aug. 29, 1972

[54] SELF-CLEANING AIR SCRUBBER

[72] Inventor: Richard W. Rush, 2440 4th Ave., Sacramento, Calif. 95818

[22] Filed: May 6, 1970

[21] Appl. No.: 34,979

[52] U.S. Cl. .................55/228, 55/250, 55/259, 261/22, 261/116, 261/119
[51] Int. Cl. .........................................B01d 47/06
[58] Field of Search.................55/84, 93–95, 220, 55/223, 226–228, 239, 245, 250, 259, 260; 261/116, 119, 114, 22, 62

[56] References Cited

UNITED STATES PATENTS

| | | | |
|---|---|---|---|
| 1,042,055 | 10/1912 | Theisen | 261/119 |
| 1,103,945 | 7/1914 | Murray | 261/119 |
| 1,167,909 | 1/1916 | McDonald | 261/119 |
| 1,926,433 | 9/1933 | Cartwell | 55/250 |
| 2,484,277 | 10/1949 | Fisher | 5/223 |
| 2,786,082 | 3/1957 | Klockman | 261/114 |
| 3,066,462 | 12/1962 | Yap et al. | 55/DIG. 25 |
| 3,113,168 | 12/1963 | Kinney | 261/116 |
| 2,373,505 | 4/1945 | Hupp | 261/119 |

Primary Examiner—Bernard Nozick
Attorney—William H. Maxwell

[57] ABSTRACT

An air conditioning scrubber for filtering contamination and foreign particles out of a moving air column by means of hydrolyzation and precipitation a pressurized cold water vapor permeated atmosphere and from which said contamination and particles are accumulated as debris or flotsam that is continuously driven by the moving air column and induced wave motion to a collector and discharged.

18 Claims, 4 Drawing Figures

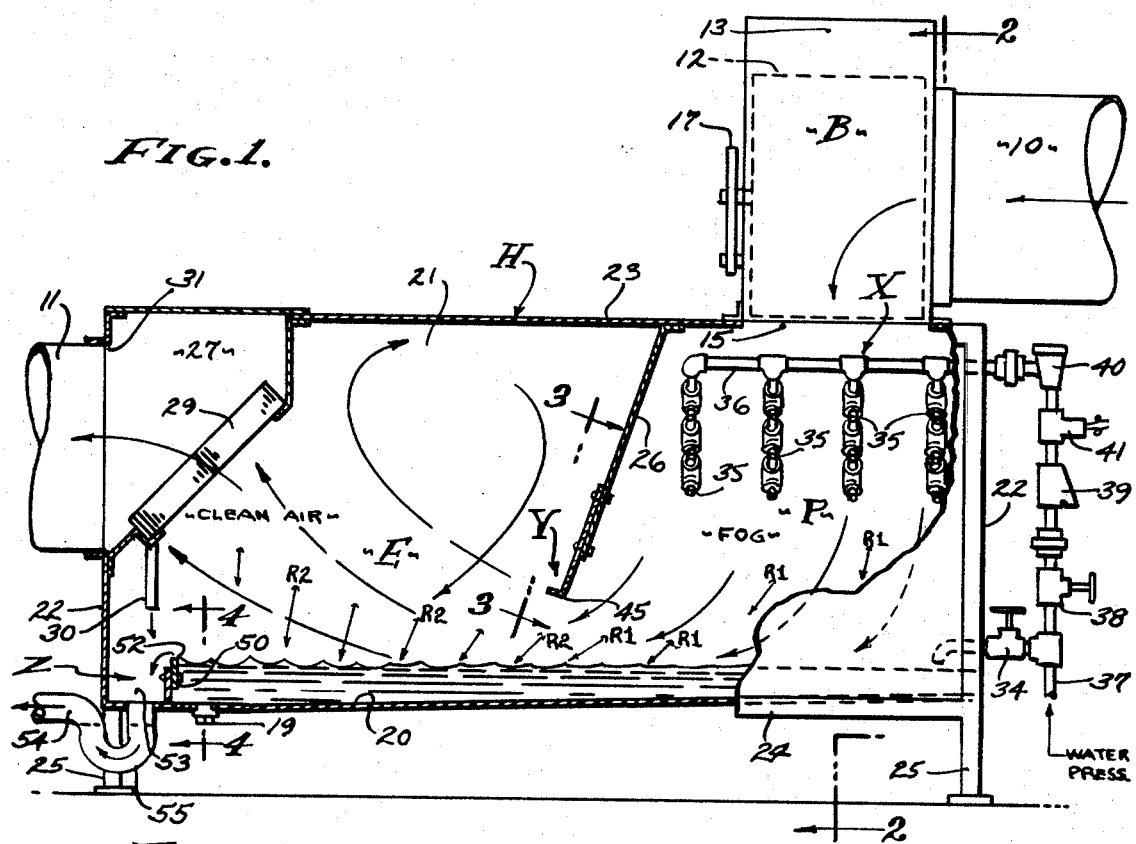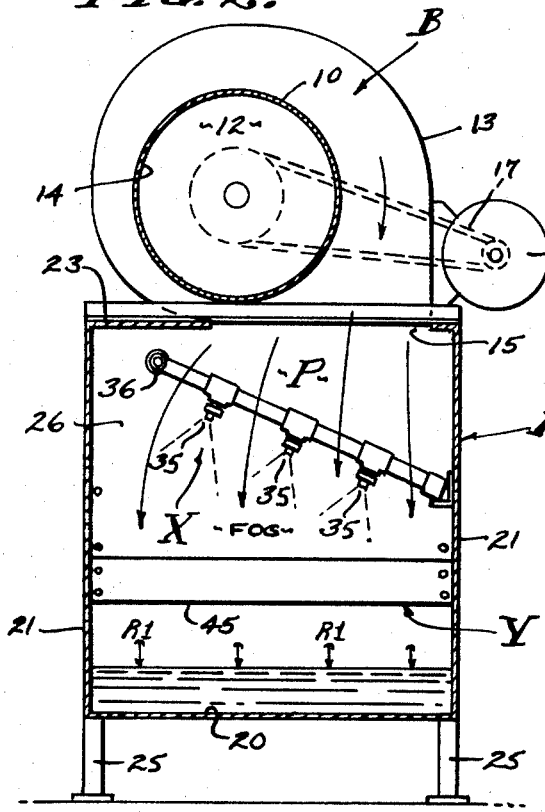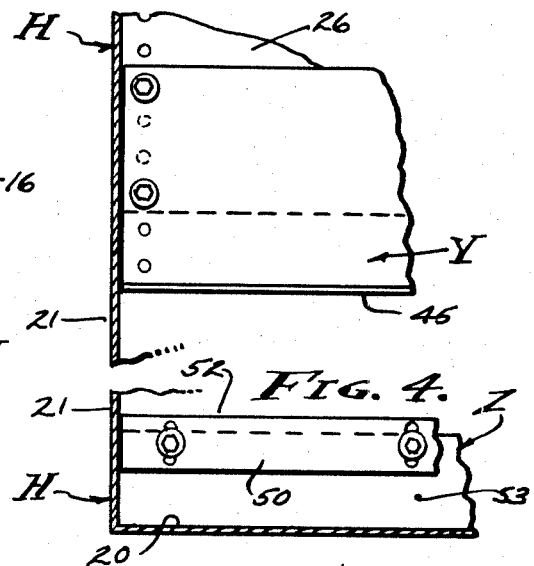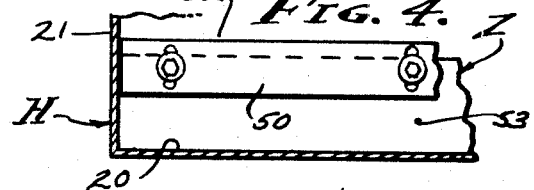

SELF-CLEANING AIR SCRUBBER

Air conditioning is widely used to clean air for discharge and/or reuse, and it is to this general use that the scrubber of the present invention is employed. Large assemblies of people, and the practice of various occupational processes, liberate large quantities of contamination into the air and which are dealt with by varied types of scrubbers and filters, most of which involve complexity, expense, maintenance and constant attention related to the removal of accumulated contamen. For example, noxious odors, smoke, dust and grease vapors and the like are to be removed from the air which is then recirculated. It is, therefore, a general object of this invention to provide a self-maintaining air scrubber of the type under consideration that is self-maintaining while continuously discharging contamination.

With the present invention a direct mode of operation is effected wherein air contamination is intimately associated with water so as to be enveloped and caused to precipitate into a basin where an accumulation thereof in the form of debris or flotsam occurs. Unique with this scrubber and its mode of operation is the concurrent pressurizing of the precipitation and expansion chambers and flowing of the air over the accumulated debris or flotsam laden water contained therein, and to the end that the debris or flotsam is driven in a predetermined manner to be collected for subsequent discharge. Therefore, an object of this invention is to provide an apparatus herein referred to as a "scrubber" causes contamination and particle precipitation and which causes the treated air to blow over an accumulation of said precipitated water laden with debris, and which thereby causes the collection in the form of debris and/or flotsam that is driven to a collector for discharge.

The apparatus hereinafter disclosed is characterized by a basin in which water precipitation is accumulated and from which contamination and foreign particles are continuously removed. In order to gain this removal function, wave motion is induced by force of the moving air, said wave motion being determined by the depth of the basin in which the water precipitation is accumulated. Jointly with the induction of said wave motion effect, the precipitation chamber is maintained at somewhat greater pressure than the expansion chamber of the apparatus; and to these cooperative ends there is provided a selectively adjustable baffle that nozzles the air so as to induce said wave motion while maintaining a suitable pressure balance between the two said chambers and all of which is commensurate with the air flow restriction through the ducting system that is being serviced. Therefore, it is an object to provide a multi-purpose baffle in an air scrubber having the facilities herein referred to and which controls precipitation pressure, delivery pressure, and which induces controlled wave motion in the precipitant, resulting in a self-cleaning action.

The various objects and features of this invention will be fully understood from the following detailed description of the typical preferred form and application thereof, throughout which description reference is made to the accompanying drawings, in which:

FIG. 1 is a longitudinal sectional view of the air scrubber.

FIG. 2 is a transverse sectional view taken as indicated by line 2—2 on FIG. 1.

FIGS. 3 and 4 are enlarged fragmentary sectional views taken as indicated by line 3—3 and 4—4 on FIG. 1.

In the drawings a typical embodiment of the self-cleaning air scrubber is shown and wherein poluted air is received from an intake air duct 10 and is redelivered to a delivery air duct 11. The scrubber apparatus is a self-contained unit interposed between said two ducts and through which the air column to be treated is blown, said unit having the configuration of a box-like housing H. The air column movement can be effected by any suitable means in the ducting referred to and preferably by an air pump or blower B that joins the intake air duct 10 to the housing H, the blower being shown as a centrifugal type blower having a wheel 12 revolving within a volutely curved scroll 13, with an axial opening 14 in the scroll in openly connected communication with the intake air duct 10 and with a circumferential opening 15 in the scroll in openly connected communication into the housing H. The blower wheel 12 is suitably journaled in the scroll on antifriction bearings and is rotated at a suitable speed by means of a motor 16 coupled thereto as by means of a drive belt 17, all as shown and as circumstances may require.

The housing H provides the framework and dual chambered structure which characterizes the scrubber and involves a bottom 20, opposite sides 21, opposite ends 22 and a top 23. As shown, the said housing parts are carried between corner rails 24 supported by corner legs 25. In practice, the housing H is an elongated tunnel with imperforate parts 20 through 23; and divided into two chambers, a precipitation chamber P and an expansion chamber E. In accordance with the invention, the precipitation of contamination and foreign particles is downward followed by the accumulation thereof which os lowermost and horizontal; and therefor the induction of air is vertically downward through the inlet-opening 15 of the blower, and the accumulation of precipitation is horizontal within the confines of the bottom 20. The inlet opening 15 is located in the top 23 next adjacent to the inlet end 22 of the housing, there being a vertically disposed partition 26 extending between the sides 21 and next adjacent the opening 15 opposite the inlet end of the housing. A drain or cleanout plug 19 is provided at a low point of the bottom 20, preferably at or near the collector end of the housing H. Thus, the vertically disposed precipitation chamber P is established and downwardly through which the blower air is charged into the housing while the chamber E is a horizontal continuation into which the air is nozzled and expanded. According to purposed later described, the partition 26 terminates intermediate the top and bottom of the housing a substantial distance above the bottom 20.

The bottom 20 comprises a basin that is coextensive with the plan cross section of the housing H, extending from side to side 21 and from end to end 22. These parts of the housing are imperforate and are joined in a leakproof manner, thereby establishing a tray for the accumulation of precipitation, the bottom 20 being a flat horizontally disposed panel. It will be apparent that any desired depth of water can be contained therein.

The outlet end 22 of the housing H can vary in order to satisfy forced air ducting requirements, and as shown there is a single duct 11 eminating from the outlet end 22 next adjacent to the top 23. In practice, the upper diagonal corner area of the housing is devoted to a plenum 27 defined by an inclined partition wall 28 that carries a replaceable moisture collecting filter 29. The filter is carried in a frame having a trough and drain tube 30 emptying onto the bottom 20. One or more removable access panels are provided for cleaning and/or replacement of said filter etc., and the air discharge into the duct 11 is through an opening 31 in openly connected communication between the housing and duct.

The housing and chamber arrangement hereinabove described is provided with fog generating means X, a baffle Y and a contamination collector means Z. The solvent to be employed in this instance is cold water in mist form from the means X and which will wet and envelop airborn contamination and/or foreign particles and cause them to precipitate and drop vertically, in this apparatus aided by the downward flow of air pressured into chamber P. The air baffle Y cooperates with the partition 26 to separate the chambers P and E and to simultaneously establish an air flow restriction with high air velocity over the water surface accumulated in the basin of bottom 20. And the collector Z is the recipient of the functions inherent in the foregoing relationship of parts and elements whereby fallen pollutents and/or foreign particles accumulate and are driven by the air and wave motion so as to collect in mass at the discharge end of the housing H.

The fog generating means X that introduces a cold water mist into the precipitation chamber P can vary in design and construction and has for its general purpose the continuous application of moisture in near vapor form. Reference to "fog" defines water or the like that is reduced to a fine spray so as to be imperscetible or visible as particles of moisture floating in the air. To this end therefore, the preferred embodiment of the means X involves one or more downwardly disposed fogging nozzles 35 mounted in the upper portion of the chamber P, and for example a multiplicity of nozzles 35 ranked together in equally spaced relation across the cross sectional area of air flow and fed cold water from a manifold 36. Said manifold receives water under pressure from a supply pipe 37 and control valve 38, there being a line strainer 39 and vacuum breaker or check valve 40 in the series, and all of which supplies water to the nozzles as may be required. Further, a solenoid valve 41 is provided to open with energizing of the circuit to the blower motor 16, thereby coordinating the water supply with the flow of air through the housing H. There is also a flood valve 34 from supply pipe 37 into the bottom 20 of the housing for filling.

The air baffle Y that cooperates with the partition 26 to divide the housing H into the two chambers P and E is essentially an airflow restricting device which serves the additional purposes of creating pressure change and of establishing a high velocity directional air at and above the level of water in the basin of the bottom 20; and also of balancing the pressure between the chambers P and E as will be dictated by ducting requirements. Although an optimum placement for the baffle is feasible, it is made adjustable since installation requirement cannot always be predicted. Accordingly, the air baffle Y is selectively adjustable, having a movable lip 45 extending horizontally from side to side 21 and which can be positioned vertically as circumstances require. As shown, the lip 45 is normally positioned in close proximity to the water level in the basin of the bottom 20, thereby effecting a nozzle action to direct air at high velocity through the chamber E and over the water surface and toward the collector means Z at the discharge end of the housing H.

Referring now to FIG. 1 of the drawings in light of the parts and elements related as hereinabove described; it will be seen that a very simple and effective airflow is established through the housing H. The moving air column is directed downwardly under pressure into the precipitation chamber P wherein it is restrained by the baffle Y and charged with a "fog" cold water that is effective to hydrolyze particles carried by the incoming air causing them to undergo decomposition involving the addition of the elements of water. Cold water preferably below 60° 70° F. is most effective. Simultaneously with the above, the water mist or "fog" envelops particles and all of which induces the formation of droplets and causes precipitation, which is by force of gravity in the downward direction toward the bottom 20. A feature of the scrubber is the provision of the selectively adjustable air baffle Y that nozzles the moving air column into the expansion chamber E where the adiabatic change in pressure causes the remaining mist to drop from the moving air, and to this end the chamber E is shaped so as to induce turbulent airflow with recirculation forwardly onto the accumulated water surface in the said chamber (see airflow arrows in FIG. 1). Since there will be a tendency toward humidity in the air flowing into plenum 27, the dehumidifying filter 29 is provided to collect water mist or "fog" and to divert the collection through the tube 30 and out of the moving air column. It will be seen that there is established a primary and secondary fallout of air contamination and/or particles, the former of major proportion within the precipitation chamber P and the latter of minor but equally significant proportion within the expansion chamber E. Both the primary and secondary fallout is accumulated upon the bottom 20 of the housing H where it establishes a liquid level for discharge now to be described.

The collector means Z that receives the accumulated pollutents and foreign particles is operative to do so when said pollutents and particles are driven thereto on the water surface as debris or flotsam. In its simplest form the means Z is a stand-pipe or any suitable overflow located at the discharge end of the housing H to pass off the accumulated precipitation. Thus, the means Z has two functions, to control the water level in the basin of the bottom 20, and to relieve the housing of the fog-water volume introduced by the fog generating means X (also the accumulated pollutents and/or foreign particles). In its preferred form the collector means Z involves a weir 50 spaced inwardly from the end 22 and extending from side to side 21. The weir is shallow and has a horizontally disposed and movable lip 52 which can be positioned vertically as circumstances require. As shown, the weir establishes a shallow dam over which the excess water, pollutents, and debris or flotsam flow into a trough 53 and through a drain 54 protected by a trap 55. Thus, air under pressure will not exhaust through the discharge of liquid pollutents.

From the foregoing it will be seen that the air is processed in an unobstructed tunnel-like housing H which receives downwardly flowing air and turns it to move horizontally for advantageous purposes. The initial downward flow is most compatible with the phenomenon of precipitation and promotes the process wherein the "fog" (fine water mist) wets and envelops and hydrolyzes contamination and foreign particles in the intake air. The flower air is captured under controlled pressure within the precipitation chamber P to aid and enhance the wetting and enveloping and hydrolyzing, and is controllably released from the chamber P by the air baffle Y that is selectively positioned to meet installation requirements; it being necessary to limit the release of air so as not to over pressure the delivery air ducting 11. A unique feature of the present invention is the cooperative relation of the baffle lip 45 to the water surface accumulated in the basin of bottom 20; where the primary air is expelled from chamber P into the chamber E as secondary air. The said expulsion of air is restricted and nozzled as a sheet of wind overlying and in restrictive contact with the water surface. Since the water is debris laden as a result of fallen contamination in chamber P, the sheet of overlying wind has its effect to drive floating particles forwardly.

A feature of the invention is that dynamics is involved so as to ensure floatation of said fallen contaminants, and in this respect they are kept in motion and immediately transported to the collector means Z for discharge. Therefore, a selective balance between wind velocity by the baffle Y and active wave motion is to be desired, and which is accomplished by adjusting the weir lip 52 so as to establish wave depth, as a function of shallowness to the bottom 20; followed by adjusting the height of the lip 45 of the baffle Y from the established water level so as to establish the airwind velocity.

The primary fallout is indicated in FIGS. 1 and 2 as R1 confined to the precipitation chamber P, while the secondary fallout R2 confined to the expansion chamber E is indicated in FIG. 1. Accumulated fallout R1 and R2 fallen onto the surface of the water in the basin of bottom 20 is driven by wind and wave motion which carries to the weir 50 where overflow thereof occurs into the trough 53. The trough collects the contamination laden liquid and the trap 55 permits discharge of liquid while retaining gas-air pressure to prevail within the housing H. As a consequence of the foregoing functions the volume of water charged into the housing H as a fog or mist is precipitated with contamination entering through the chamber P under increased pressures and continuously accumulated upon the surface of the water body coextensive with the basin of the bottom 20. The air pressure drops after it passes beneath the baffle Y and the adiabatic change causes the remaining "fog" or mist to rain from the moving air column. In practice, the air in expansion chamber E leaves the surface of the water while the induced wave motion in the heavier fluid continues to apply its driving effect that transports floating debris over the weir 50. Thus, the collection of contamination is dynamic and self purging, whereby the air scrubber is self-cleaning and does not load up with sludge and the like.

Having described only typical preferred form and application of my invention, I do not wish to be limited or restricted to the specific details herein set forth, but wish to reserve to myself any modifications or variations that may appear to those skilled in the art.

Having described my invention, I claim:

1. A self-cleaning air scrubber for removing contamination from a column of air and including; a tunnel-like housing with an intake opening at one end and a delivery opening at the other end and having a horizontally disposed tray with a bottom extending between said ends, a baffle intermediate the ends of the tunnel-like housing and dividing it into two chambers namely a vertically disposed precipitation chamber and a horizontally disposed expansion chamber, said baffle having a horizontally disposed lip extending transversely of the tunnel-like housing and spaced above said tray forming an airflow restricting nozzle over a water level therein, means pressuring the column of air to move through the intake opening and downwardly through the first mentioned precipitation chamber for discharge through said nozzle and along said water in the tray and into the expansion chamber, fog generating means permeating the column of air entering the precipitation chamber with water mist, and collector means in the form of a weir mounted on the tray having a horizontally disposed lip extending transversely over and spaced above the said bottom at the said other end of the tunnel-like housing to establish said water level and for receiving and discharging contamination fallout carried upon accumulated water passing over said weir, the column of air discharging through the delivery opening at said other end of the tunnel-like housing.

2. The self-cleaning air scrubber as set forth in claim 1 and wherein the intake opening at said one end of the tunnel-like housing is vertically disposed for inducing downward precipitation of fog-mist enveloped contamination within the precipitation chamber.

3. The self-cleaning air scrubber as set forth in claim 1 and wherein the nozzle formed by the baffle lip is disposed to project the column of air horizontally for inducing wave motion upon the said accumulated water level to carry contamination fallout to said collector means.

4. The self-cleaning air scrubber as set forth in claim 1 and wherein the baffle is a vertically disposed wall wherein the nozzle formed by the baffle lip projects the column of air horizontally for inducing wave motion upon the said accumulated water level to carry contamination fallout to said collector means and turbulate the column of air for inducing recirculation thereof with air discharged through said nozzle.

5. The self-cleaning air scrubber as set forth in claim 1 and wherein the lip of the baffle is vertically adjustable to determine the nozzle aperture and thereby control the precipitation chamber pressure and expansion chamber pressure.

6. The self-cleaning air scrubber as set forth in claim 1 and wherein the fog generating means is comprised of at least one downwardly disposed nozzle liberating fine water spray as particles of moisture floating within the column of air.

7. The self-cleaning air scrubber as set forth in claim 1 and wherein the fog generating means is comprised of a bank of downwardly disposed spray nozzles liberating fine mist from a pressured water supplied manifold as particles of moisture floating within the column of air.

8. The self-cleaning air scrubber as set forth in claim 1 and wherein the weir of the collector means has a vertically adjustable horizontally disposed lip extending transversely over the bottom to establish said water level and over which the contamination fallout drops to the exterior of the tunnel-like housing.

9. The self-cleaning air scrubber as set forth in claim 1 and wherein the weir of the collector means has a vertically adjustable horizontally disposed lip extending transversely over the bottom to establish said water level and over which the contamination fallout drops through a tubular air trap to discharge at the exterior of the tunnel-like housing.

10. A self-cleaning air scrubber for removing contamination from a column of polluted air and including; a tunnel-like housing comprised of imperforate top, a horizontal tray with a bottom, sides and ends, a baffle depending from the top and extending between the sides intermediate the ends of the tunnel-like housing and dividing it into two chambers namely a vertically disposed precipitation chamber and a horizontally disposed expansion chamber, an intake opening into the precipitation chamber and a delivery opening from the expansion chamber, said baffle having a horizontally disposed lip extending transversely in spaced relation to and above said tray and bottom forming an airflow restricting nozzle over a water level therein, means pressuring the column of air to move through an intake opening and downwardly through the first mentioned precipitation chamber for discharge through said nozzle and along said water in the tray and into the expansion chamber, fog generating means permeating the column of air entering the precipitation chamber with water mist, and collector means in the form of a weir mounted on the tray having a horizontally disposed lip extending transversely over and spaced above the said bottom at the said other end of the tunnel-like housing to establish said water level and for receiving and discharging contamination fallout carried upon accumulated water passing over said weir, the column of air discharging through the delivery opening at said other end of the tunnel-like housing.

11. The self-cleaning air scrubber as set forth in claim 10 and wherein the intake opening into said precipitation chamber is vertically disposed through the top of the tunnel-like housing, for inducing downward precipitation of fog-mist enveloped contamination within the precipitation chamber.

12. The self-cleaning air scrubber as set forth in claim 10 and wherein the nozzle formed by the baffle lip is disposed to extend between the sides of the tunnel-like housing to project the column of air horizontally for inducing wave motion upon the said accumulated water level to carry contamination fallout to said collector means.

13. The self-cleaning air scrubber as set forth in claim 10 and wherein the baffle is an imperforate vertically disposed wall wherein the nozzle formed by the baffle lip projects the column of air horizontally for inducing wave motion upon the said accumulated water level to carry contamination fallout to said collector means and turbulate the column of air for inducing recirculation thereof with air discharged through said nozzle.

14. The self-cleaning air scrubber as set forth in claim 10 and wherein the lip of the baffle is vertically adjustable to determine the nozzle aperture over the accumulated water level and thereby control the precipitation chamber pressure and expansion chamber pressure.

15. The self-cleaning air scrubber as set forth in claim 10 and wherein the fog generating means is comprised of at least one downwardly disposed nozzle liberating fine water spray as particles of moisture floating within the column of air.

16. The self-cleaning air scrubber as set forth in claim 10 and wherein the fog generating means is comprised of a bank of downwardly disposed spray nozzles liberating fine mist from a pressured water supplied manifold as particles of moisture floating within the column of air.

17. The self-cleaning air scrubber as set forth in claim 10 and wherein the weir of the collector means has a vertically adjustable horizontally disposed lip extending transversely between the said sides to establish said water level and over which the contamination fallout drops to the exterior of the tunnel-like housing.

18. The self-cleaning air scrubber as set forth in claim 10 and wherein the weir of the collector means has a vertically adjustable horizontally disposed lip extending transversely between the said sides to establish said water level and over which the contamination fallout drops through a tubular air trap to discharge at the exterior of the tunnel-like housing.

* * * * *